United States Patent [19]

Svoboda

[11] Patent Number: 4,560,137

[45] Date of Patent: Dec. 24, 1985

[54] POSITIONING DEVICE FOR A SUPPORTED ARTICLE

[75] Inventor: Rudolf Svoboda, St. Pölten, Austria

[73] Assignee: Svoboda Entwicklungs KG, St. Polten, Austria

[21] Appl. No.: 493,643

[22] Filed: May 11, 1983

[30] Foreign Application Priority Data

May 11, 1982 [AT] Austria ................................ 1848/82

[51] Int. Cl.[4] ............................................ F16M 13/00
[52] U.S. Cl. .................................. 248/652; 248/393;
74/96; 74/531; 188/83
[58] Field of Search ............... 248/652, 646, 651, 655,
248/664, 371, 393, 397, 185, 678; 74/96, 531;
188/83

[56] References Cited

U.S. PATENT DOCUMENTS

| 866,278 | 9/1907 | Hemenway | 188/83 |
| 1,509,523 | 9/1924 | Monosmith | 188/83 |
| 2,002,538 | 5/1935 | Kindelmann | 248/652 |
| 2,294,516 | 9/1942 | Smith | 188/83 |
| 2,534,386 | 12/1950 | Stewart | 248/371 |
| 2,832,443 | 4/1958 | Dunham | 188/83 |
| 3,406,933 | 10/1968 | Wait | 248/371 |
| 3,489,250 | 1/1970 | Kuhlmann | 188/83 |
| 3,784,147 | 1/1974 | Harder, Jr. | 248/371 |

FOREIGN PATENT DOCUMENTS 1264709 3/1968 Fed. Rep. of Germany.

Primary Examiner—J. Franklin Foss
Assistant Examiner—Robert A. Olson
Attorney, Agent, or Firm—Karl F. Ross; Herbert Dubno

[57] ABSTRACT

A device for positioning loads such as computer terminals or parts thereof has a pair of plates which are adjusted with respect to one another with an eccentric on a shaft between the plates which is rotated by a handle disposed outside the space between them. According to the invention, a friction brake is provided between the plates and engages the shaft to prevent undesired rotation which may vary the adjusted position.

12 Claims, 7 Drawing Figures

POSITIONING DEVICE FOR A SUPPORTED ARTICLE

FIELD OF THE INVENTION

My present invention relates to a device for the rapid positioning of a support element and, more particularly, for a control of the height of a surface or body, e.g. an article of furniture, for the control of the position of a unit such as a computer facility, e.g. a keyboard, monitor, terminal or data processor, or in general for controlling the spacing between two element between which the device can be introduced. In general the device may be used for controlling the position of a body, which may be referred to as a load and a surface on which the load is to be supported and to which the weight of the load is to be transmitted.

BACKGROUND OF THE INVENTION

It is already known to provide devices for rapid adjustment of the height of an article of furniture and, of course, for varying the spacing between two elements utilizing an eccentric which is rotated by an actuating member such that the axis of the eccentric is located on one of the elements of the device and the eccentric has a camming surface which bears upon the other element of the device to adjustably space the two elements apart as the eccentric is rotated about its axis.

One such arrangement is described in German patent document DE-AS 12 64 709 as a height compensating or leveling device for a foot of an article of furniture.

The axis of the eccentric, in this case, is defined by a horizontal bolt or shaft which carries a disk formed with the eccentric surface and rotatable to cam two elements apart in the height adjusting operation.

This system relies upon friction between the various elements just described and especially between the eccentric camming surface and the element bearing thereon, to retain the adjustment once it is set. Since such friction may be insufficient and the eccentric can be positioned at a point that the load tends to rotate the eccentric into another position, such devices have not been fully satisfactory.

Other devices for adjusting orientation and especially height, have various drawbacks as well. Mention may be made of screw adjustment devices which have less tendency to slip if they are provided with shallow pitches but partly as a result of such shallow pitches, can be adjusted only by time-consuming operations. Pawl and ratchet systems are also not fully reliable, generally are not continuously adjustable, i.e. do not provide a continuous height adjustment but rather operate in steps.

Consequently, a rapidly acting, fully reliable, continuously adjustable, simple and inexpensive device for the adjustable suport of a load, especially a furniture article or business machine or a computer facility, or a data processing unit has not been readily available heretofore.

OBJECTS OF THE INVENTION

It is the principal object of the present invention to provide an improved device for adjusting the position of a load, preferably one of the loads mentioned immediately above, on a supporting surface, whereby the disadvantages of earlier devices are obviated.

Another object of this invention is to provide an improved height-adjustment and/or angle or inclination-adjustment unit for a monitor or word processing or computer display facility and/or a keyboard for such a facility whereby disadvantages of earlier systems are obviated.

Another object of this invention is to provide a device of the aforedescribed type which allows continuous positioning of the supported member and which can be rapidly operated and retains the set position automatically.

SUMMARY OF THE INVENTION

These objects and others which will become apparent hereinafter are attained, in accordance with the invention, in a device for the purposes described whidh includes a base plate or support element defining an axis, a shaft rotatable about this axis on the support element, an actuating lever or other member for rotating this shaft at least through a portion of a full rotation, at least one eccentric disc mounted on the shaft and rotatable therewith while having an eccentric surface bearing upon another element adapted to carry the load, whereby the spacing between these elements is determined by the angular position of the shaft about its axis, and one or more brake members engaging the shaft for retaining the same in the position in which the shaft is set by the actuator until the actuator displaces the shaft into another position.

The use of brake elements in the system of the invention has the advantage that even large restoring forces which may act upon the eccentric can be readily resisted because the brake elements can apply friction forces independent of the friction forces involving the eccentric and thus retain the latter in its set position against unintentional movement out of this position.

Advantageously, the brake elements can include additional eccentrics carried by the shaft and adapted to bear upon a brake member to an increasing extent in those angular positions of the shaft where the greater restoring forces may apply. The system then becomes self-locking not only in the position of the main eccentric in which there is no restoring force, but also in the position of the secondary or braking eccentric in which there is restoring force and hence the range over which self-locking forces can apply is increases. The secondary eccentric can also be positioned so that any restoring force which may be applied thereto by the brake element against which it bears can act counter to the restoring force applied by the load.

According to yet another feature of the invention, the brake element can include a spring plate pressed against the eccentric-carrying shaft. To increase the braking effect, the spring plate can be provided in the region in which it contacts this shaft with a brake lining or shoe having a high frictional coefficient. One of the advantages of a brake shoe or lining of the composition of a conventional automotive vehicle or other machine brake shoes is that the braking force remains constant over long periods of time.

It is also possible to provide, in assocation with such friction braking, a degree of indexing of the eccentric shaft in various selected positions and this can be accomplished by forming the shaft with a polygonal cross section so that successive facets of this polyhedral or prismatic region are engaged by the spring plate.

Furthermore, the spring plate can engage the auxiliary or secondary eccentric which can be positioned so that the force applied by the spring plate to the secondary eccentric acts upon the eccentric-carrying shaft in a sense opposite the force applied by the load on the element against which the main eccentric bears.

I have also found it to be advantageous to adjust the force with which the braking element acts upon the shaft, preferably in accordance with the load to be supported so that, for example, when the load is relatively light, undue braking force is not applied to make the desired actuation of the eccentric shaft more difficult. A simple means for this purpose can include a screw adjusting the position of the spring plate and limiting its displacement in the direction of the base or support plate.

The base or support plate can also form a pivot for the load plate, this pivot being spaced from the eccentric shaft so that the load plate is swingably mounted on the support plate and the angle of tilt is adjusted. This construction has been found to be particularly advantageous for adjusting the position of electronic devices.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
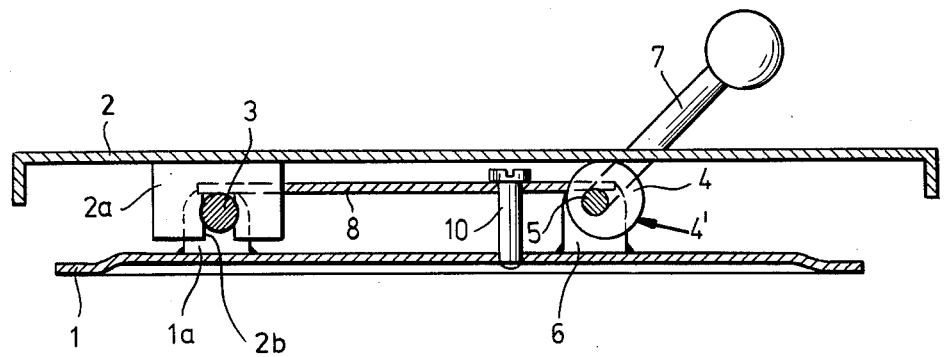
FIG. 1 is a vertical cross-sectional view through the first embodiment of the invention which, like the other embodiment described herein can be used effectively as a support for the display monitor of a computer terminal.

In FIG. 1 of the drawing, the device of the invention which can be utilized to support a computer terminal or a part thereof such as a monitor and its display screen and/or a keyboard, comprises a base plate adapted to rest upon a table, a load-carrying plate 2 which is swingable on a shaft 3 and the base plate 1.

More particularly, the base plate 1 can have upstanding lugs 1a in which the shaft 3 is mounted and the load-carrying plate 2 can have downwardly extending lugs 2a which are slotted at 2b so that they can be snapped over the shaft 3 and can swing thereon adjacent the lugs 1a.

The base plate 1 is also provided with a pair of journals 6 in which a shaft 5 is rotatable and this shaft 5 carries one or more eccentric disks 4 which are keyed to the shaft and thus rotated therewith. Beyond the lateral edge of the plate 2, the hand lever 7 is connected to the shaft 5 to enable the latter to be rotated manually.

The eccentric disks 4 have outer eccentric surfaces 4' which bear directly on the underside of the load plate 2.

Figure 3:
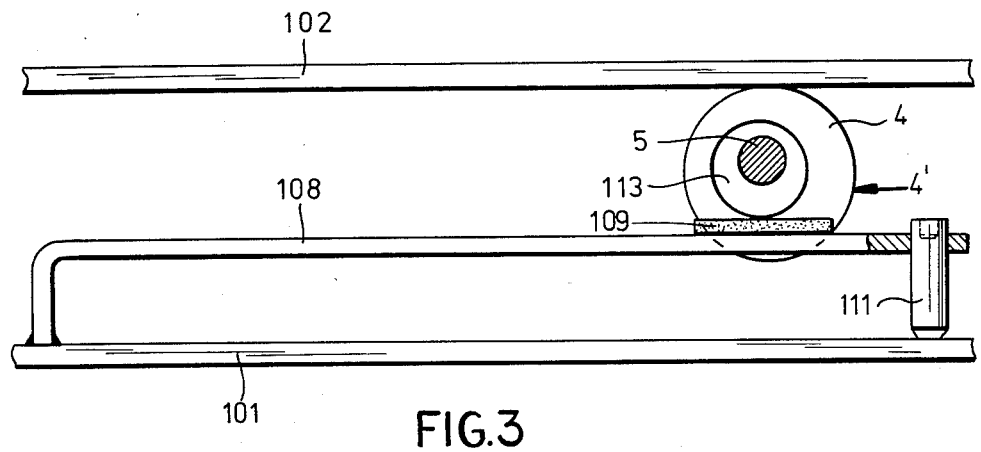
FIG. 3 is a detail view of the relationships of the elements shown in FIG. 2 and drawn to a larger scale.

According to the invention, a braking element in the form of a spring plate 8 is provided. This braking element is welded to that fixed shaft 3 and rests upon the eccentric shaft 5, being drawn thereagainst with adjustable force by a screw 10 which is threaded into the plate 1. The underside of the spring plate 8 can be provided with a brake lining as has been illustrated at 109 in FIG. 3.

It will be apparent, therefore, that in whatever position the shaft 5 has been rotated by the lever 7 and hence for each height adjustment of the right hand end of the load plate 2, the eccentric is retained by the additional friction force contributed between the spring plate 8 and the shaft 5.

Figure 2:
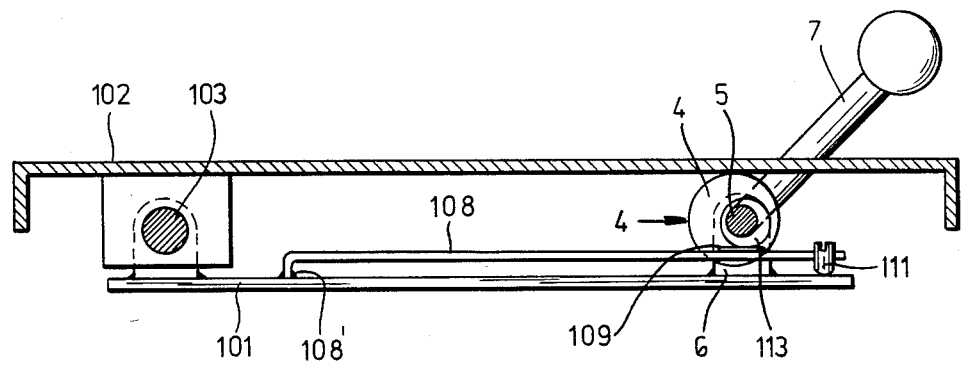
FIG. 2 is a view similar to FIG. 1 illustrating the second embodiment.

In the embodiment of FIG. 2, the load plate 102 is also rotatable on the shaft 103 of the base plate 101, but the spring plate 108 is not affixed or applied to the shaft 103, but rather is welded at 108' to the upper surface of the plate 101. Here moreover, the spring plate 108 bears against an eccentric 113 carried by the shaft 5 via the brake lining 109 and has a force which is determined by the degree to which the setscrew 111, threaded into the plate 108, bears against the upper surface of the plate 101.

Figure 4:
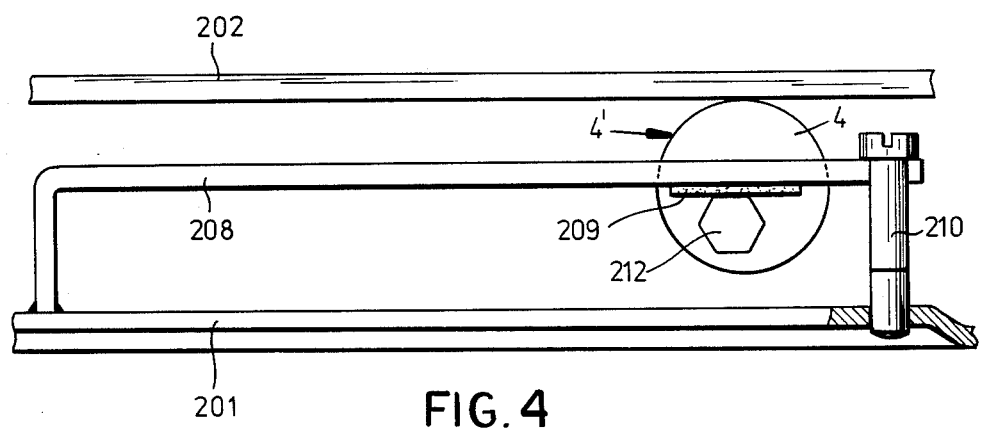
FIG. 4 is a view similar to FIG. 3 but illustrating still another embodiment of the invention.

The embodiment of FIG. 4 functions similarly except that instead of a completely circular shaft 5, a central portion of the shaft may be made polygonal as shown at 212. In this case, the spring plate 208 bears upon the polygonal portion 212 of the shaft from above via the brake lining 209 and is drawn forceably against the shaft by traction screw 210 threaded into the plate 201. The load is carried by the plate 202 against which the eccentric disks 4 bear.

It should be noted that for all ordinary loads the system of FIG. 1 generally will suffice. When, however, extraordinary loads are to be carried by the plate, it is desirable to balance the force which may be applied by the load to the shaft by using the eccentric 113 the latter being positioned so that the force of the spring plate 108 thereon counteracts the restoring force of the load on the eccentric 4. Furthermore, this system allows the braking force to increase as the load contribution to the restoring force increases because the eccentric 113 tends to bend the spring plate 108 to a greater extent and thereby increase the force applied by this plate upon the eccentric 113.

Along the shaft 5, a plurality of such spring plates 8 can be provided and, of course, when the auxiliary eccentrics 113 are used, an equivalent number of such auxiliary eccentrics are provided.

Figure 7:
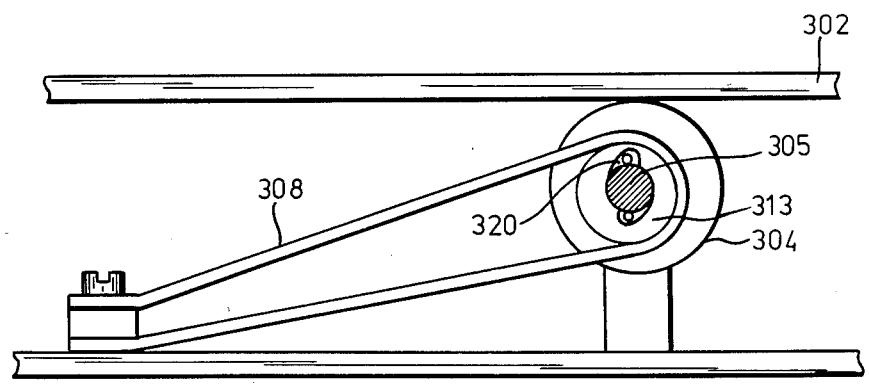
FIG. 7 is a view similar to FIG. 4 showing the application of a band brake to the system.

To brake the eccentric 4, the shaft 5 can be provided, as can be seen from FIG. 7, with a band brake 308 which can engage a braking disk 313 which is cylindrical and centered on the shaft 305 so that, as the shaft rotates, the disk 313 is retarded and hence the frictional resistance to rotation of the eccentric 304 as the plate 302 bears thereon is increased. It has been found to be advantageous to provide, between this disk and the shaft 305 a unidirectional clutch 320, thereby making the disk 313 a slipdisk in one direction so that, for example, upon raising of the plate 2, the eccentric 304 is rotated by the handle with no braking effect, i.e. the disk slips while rotation of the shaft 305 and the eccentric 304 in the opposite direction is braked.

The shaft 4 can also be prevented from rotation by using a multithreaded self-locking screw or worm drive which has an advantage when extremely large loads are applied to the support plate.

Figure 5:
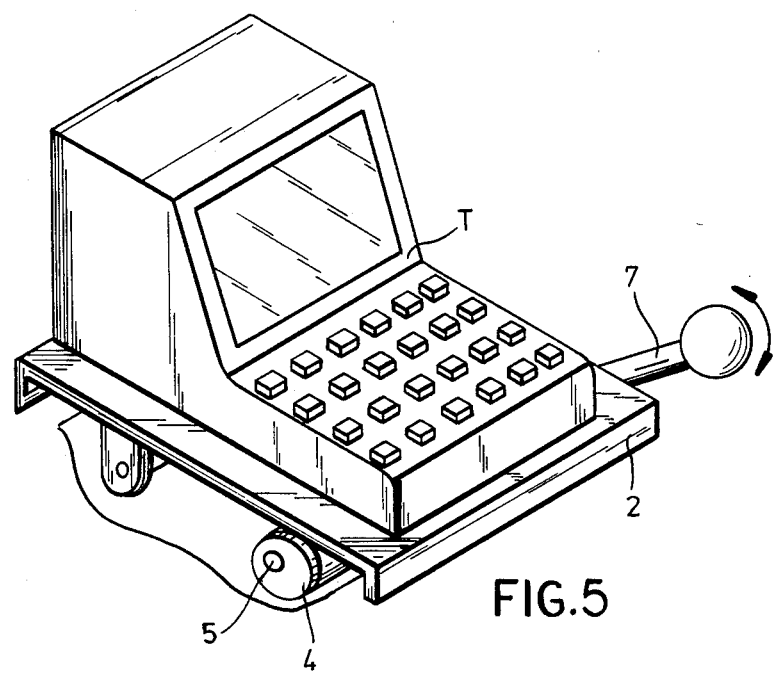
FIG. 5 is a diagrammatic perspective view, partly broken away showing the application of the device of FIG. 1 to the adjustable support of a computer terminal.
Figure 6:
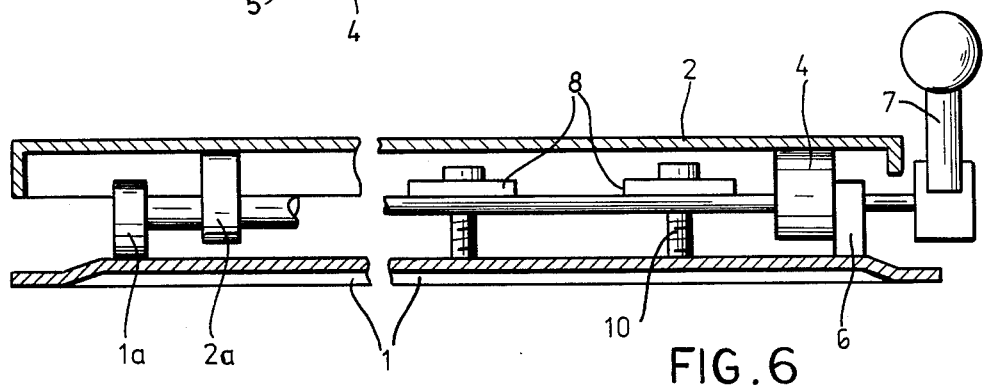
FIG. 6 is a cross-sectional view through the embodiment of FIG. 1, taken in a plane parallel to the axis of the eccentric shaft.

In FIG. 5 I have shown a computer terminal T carried by the support plate 2 and have illustrated a second eccentric 4 on the shaft 5 remote from the handle 7.

I claim:

1. A rapid action device for adjusting the position of a load with respect to a surface, comprising:
   a pair of plates, the first of which is adapted to rest upon said surface and a second of which is adapted to receive said load;
   means defining a pivot interconnecting said plates;
   a shaft journaled directly on one of said plates and disposed between said plates parallel to said pivot;
   means including a handle located outside of the outlines of said plates and operable from a location externally of said plates engaging said shaft for rotating same;
   an eccentric carried by said shaft rotatable therewith and having an eccentric surface directly bearing only upon the other of said plates and spaced from said one of said plates for urging said plates apart upon rotation of said shaft in one sense; and
   friction brake means engaging said shaft for resisting rotation thereof at least in the opposite sense, said friction brake means including a flat spring plate between said first and second plates and bearing against said shaft, said spring plate being attached at one end to said one of said plates, and
   adjusting means being said first and second plates including a screw at an opposite end of said spring plate and engaging said one of said plates for varying the force with which said spring plate bears against said shaft.

2. The device defined in claim 1, further comprising a brake lining interposed between said shaft and said spring plate.

3. The device defined in claim 2 wherein said brake lining is on said spring plate.

4. The device defined in claim 1 wherein said screw is arranged to draw said spring plate against said one of said plates.

5. The device defined in claim 1 wherein said shaft is provided with an auxiliary eccentric, said spring plate bearing against said auxiliary eccentric.

6. The device defined in claim 1 wherein said shaft is provided with a polyhedral portion engageable by said spring plate for indexing said shaft in selected angular positions.

7. A positioning device for an electronic component which comprises:
   a base plate adapted to rest against a surface;
   a load-carrying plate spaced from said base plate and supporting said component;
   pivot means interconnecting said plates for tilting movement of said load-carrying plate and said component on said base plate;
   a shaft journaled directly on said base plate and positioned between said plates parallel to said pivot means;
   an eccentric mounted on said shaft for rotation therewith and having an eccentric surface directly engaging said load-carrying plate and spaced from said base plate for displacing said load-carrying plate away from said base plate upon rotation of said shaft in one sense in the region of said eccentric;
   a handle connected to said shaft and disposed externally of said plates and connected to said shaft for rotating said shaft;
   friction brake means between said plates engaging said shaft for frictionally retarding rotation of said shaft at least in the opposite sense, said friction brake means including a flat spring plate between said plates and bearing against said shaft, said spring plate having a leg bent downwardly therefrom at one end and secured to said base plate and
   adjusting means between said base and load-carrying plates and including a screw at an opposite end of said spring plate engaging said base plate for varying the force with which said spring plate bears against said shaft.

8. The device defined in claim 7, further comprising a brake linking interposed between said shaft and said spring plate.

9. The device defined in claim 8 wherein said brake lining is on said spring plate.

10. The device defined in claim 7 wherein said screw is arranged to draw said spring plate against said base plate.

11. The device defined in claim 7 wherein said shaft is provided with an auxiliary eccentric, said spring plate bearing against said auxiliary eccentric.

12. The device defined in claim 7 wherein said shaft is provided with a polyhedral portion engageable by said spring plate for indexing said shaft in selected angular positions.

* * * * *